Jan. 9, 1934. C. WALTER 1,943,230
NONREVERSING HAND CRANK
Filed March 13, 1931 2 Sheets-Sheet 1
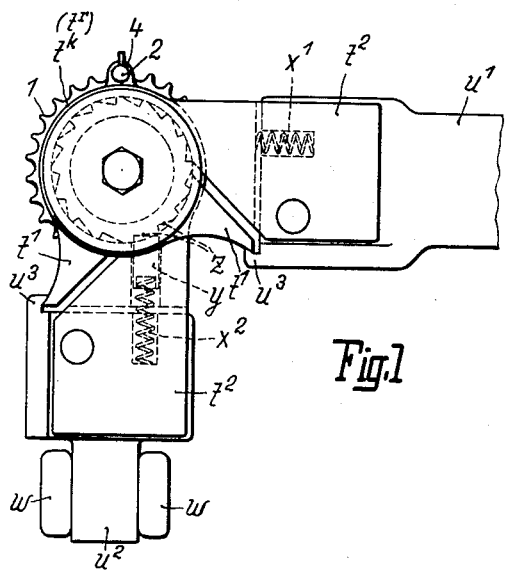
Fig.1
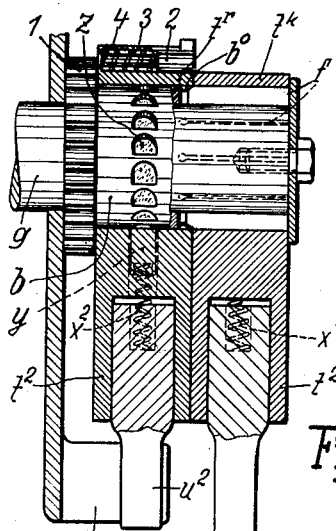
Fig.2
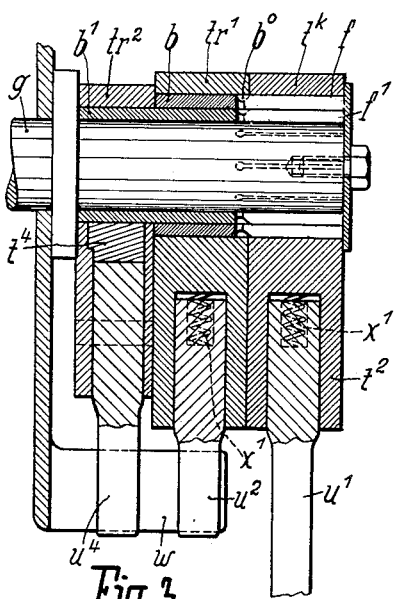
Fig.3
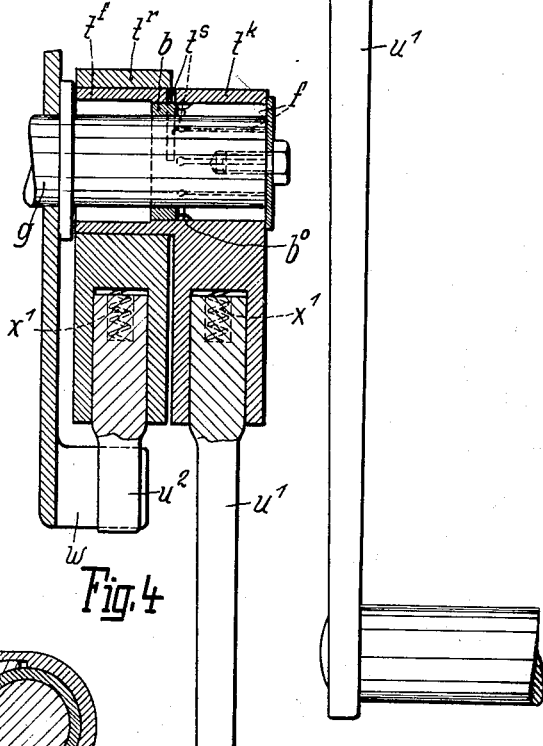
Fig.4
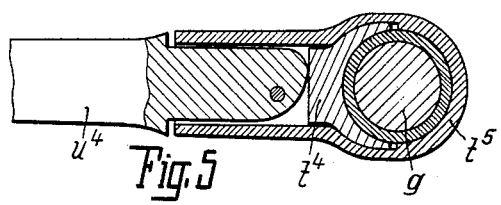
Fig.5
INVENTOR
CARL WALTER
BY
ATTORNEY Jan. 9, 1934.                     C. WALTER                        1,943,230
                           NONREVERSING HAND CRANK
                           Filed March 13, 1931              2 Sheets-Sheet 2
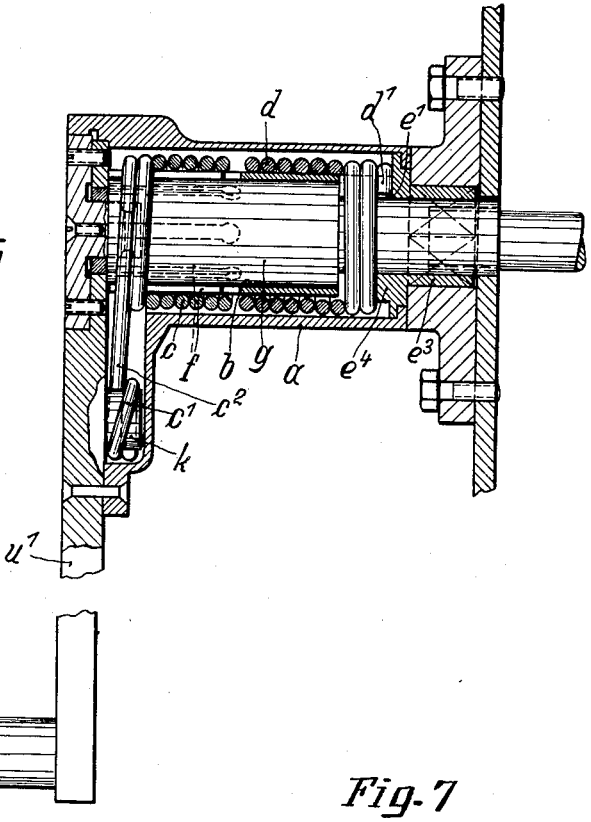
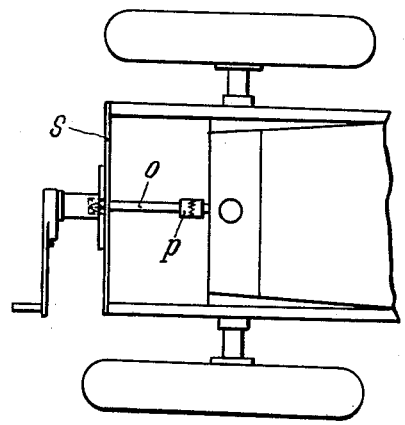
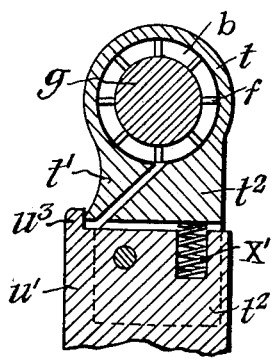
INVENTOR.
CARL WALTER
BY
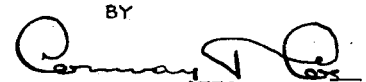
ATTORNEY Patented Jan. 9, 1934

1,943,230

UNITED STATES PATENT OFFICE 1,943,230

NONREVERSING HAND CRANK

Carl Walter, Barmen, Germany

Application March 13, 1931, Serial No. 522,401, and in Germany March 14, 1930

10 Claims. (Cl. 123—185)

My invention relates to improvements in nonreversing hand cranks.

A great disadvantage in all types of known non-reversing starting cranks such as are required for the starting of combustion engines, hoisting cranes and the like is that some part of the device must travel a certain distance before it can release the crank from the member to be operated. Thus the crank in all prior constructions makes a backward movement when a back stroke occurs before it can be released from the backward moving member or stopped by a reversal preventing clutch. Particularly in the case of heavy combustion engines or cranes which cause the operator to exert a considerable amount of power it has been proved by experience that even a very slight backstroke, frequently unnoticed at the time, can cause excruciating pain and more damage and injuries than a larger stroke.

According to the invention even the minutest reverse movement as well as movements which are independent of the force acting upon the backward moving member are prevented by a reversal preventing clutch which is connected to the crank in a permanent braking condition so that it is caused to function as soon as a reverse movement begins. In the present case the clutch may have a definite tension which the operating crank must first of all overcome; this, however, bearing in mind the power to be exercised by means of the crank, is unimportant for the immediate action of the reversal preventing clutch.

The reversal preventing clutch or crank clutch should preferably consist of a clutch actuated by a lever. Such a clutch offers special advantages for the present purpose, one of the most important advantages being a very large contact surface between the clutch and the member to be braked, namely a surface equal in size to the inside of the clutch. By means of the lever actuation a very great clutching power can be exerted so that the clutches can be comparatively small and yet have the necessary effect. A further advantage in this respect is that the clutch can be fitted in a single housing which entails economy in space as well as material. A simplified construction is also obtained if the clutch lever of the reversal preventing clutch constitutes the rotary braking member and the clutch lever of the crank clutch constitutes the crank. The two clutches, with reference to the design of the lever, can be similar in construction. A special advantage of such a clutch in the present case is that no power is required for this type of clutch to operate as all the members can be tensioned so that as soon as the force acting on the clutch begins the clutch functions with a corresponding force.

An even greater safeguard against reverse movement can be obtained according to the invention by means of a second arrangement which acts upon the clutch or on a further member similar to the clutch.

According to the invention, in such a case the crank clutch does not act directly on the shaft but upon a sleeve inserted between the two members which in turn transmits the clutch pressure of the clutch to the shaft. This offers the advantage that the shaft is braked to a greater extent than when the crank clutch acts directly on the shaft to be rotated. In such a case, the clutch can be caused to act on an interposed member instead of directly on the crank clutch so that this intermediate member alone is subjected to wear and tear.

According to a further feature of the invention an additional clutch member can be arranged between the clutch and the crank operated member in order to prevent the latter from rotating, this being achieved by means of a connection between the clutch and the rotating members as the clutch in turn is prevented from rotating. Such a locking of the rotating member is generally used, for example, in goods lifts as a safety device against breakage or for starting cranks in combustion engines to obtain compression as in such a case the crank may be repeatedly set in the most convenient position for operation by locking the crank shaft against backward rotation so that the engine fires because of the action of the compression.

The drawings show starting cranks according to the invention.

Fig. 1 shows an embodiment in side elevation.

Fig. 2 is a cross section on the line 2—2 of Fig. 1.

Fig. 3 a second embodiment.

Fig. 4 is a third embodiment in longitudinal section.

Fig. 5 shows a fourth embodiment of the coupling in cross section.

Fig. 6 shows a fifth embodiment in longitudinal section.

Fig. 7 shows a method of arranging and utilizing the coupling.

Fig. 8 is a cross section on the line 8—8 of Fig. 2.

In all the embodiments the reference numeral $g$ represents the shaft to be actuated by means of the crank $u^1$. $b$ is a sleeve partly surrounding the said member $g$ and provided with the longitudinal slots $f$. The hub of the crank lever $u^1$ surrounds the portion of the sleeve $b$ which is provided with the longitudinal slots $f$. These parts form a friction clutch which, when the crank $u^1$ is rotated, is locked on the shaft $g$ by pressing the slotted sleeve against the shaft. A clutch, hereinafter called reversal preventing clutch, is arranged on the other portion of the sleeve $b$, the said reversal preventing clutch remaining stationary when the crank $u^1$ and shaft $g$ are turned.

The two clutches, the crank lever clutch as well as the reversal preventing clutch in the embodiments according to Figs. 1 to 5 each consist of a clutch actuated by a lever. In the embodiment of the invention according to Figs. 1 and 2 the two clutches consist of a band $t^k$ embracing the sleeve $b$ in the case of the crank clutch and a band $t^r$ in the case of the reversal preventing clutch. Each band terminates in an enlarged head $t^1$ and a forked shaped head $t^2$. The crank lever $u^1$ and a lever $u^2$ are pivoted as at 5 to the forked heads $t^2$. The levers $u^1$ and $u^2$ are provided with projections $u^3$ which engage the head pieces $t^1$ in such a manner that when the levers $u^1$ or $u^2$ are started turning in the proper direction they tighten the bands $t^k$ and $t^r$ respectively. The clutch band $t^r$ in the embodiment according to Figs. 1 and 2 is also arranged on the sleeve $b$ at the side of the crank clutch band $t^k$ and its lever $u^2$ is prevented from rotating as it lies between the legs of a fixed member $w$. A spring $x^1$, Fig. 2, arranged in the crank clutch portion $t^k$ presses the projection $u^3$ of the lever $u^1$ against the head $t^1$ so that the members of the clutch which produce the clutching effect are normally slightly pressed towards clutching position. This prevents play and causes the clutch to take hold as soon as any pressure is exerted on the crank lever.

A detent $y$ shown in the embodiment according to Figs. 1 and 2 and slidably mounted in the portion $t^2$ of the reversal preventing clutch $t^r$ is pressed by a spring $x^2$ against depressions $z$ arranged in the shape of a ring in close sequence on the portion of the sleeve $b$ which comes into contact with the band $t^r$ of the reversal preventing clutch. By the pressure of the spring $x^2$ on the detent $y$ and the member $u^2$ this clutch $t^r$ is given a slight tension so that it clutches immediately as soon as the sleeve $b$ exerts a rotary pressure on the band $t^r$ in a counterclockwise direction (Fig. 1). In the same manner the sleeve $b$ is prevented by the bolt $y$ from rotating in a direction opposite to that of the crank.

A second reversal preventing clutch can also be arranged instead of the above as shown in Fig. 3. The additional reverse coupling $tr^2$ can be made to act on a concentrically arranged sleeve $b^1$ between the rotating member $g$ and the sleeve $b$, the said sleeve $b^1$ also being provided with longitudinal slots $f^1$ similar to those in the sleeve $b$ so that the crank clutch $t^k$ grips the member $g$ by means of the sleeves $b$ and $b^1$. The reversal preventing clutch $tr^1$ acts on the sleeve $b$ as shown in the embodiment according to Figs. 1 and 2.

In order to make it possible to form the walls of the sleeves $b$ or $b^1$ thicker and stronger without causing any interference with the resilience of longitudinally slotted portions, the sleeves can be slightly circumferentially grooved at the inside ends of the longitudinal slots $f$ as shown at $b^o$ in Figs. 1 and 3.

Instead of the two clutches, namely the crank clutch and the reversal preventing clutch acting upon the interposed member $b$, the crank clutch only can be made to act on the said member $b$ and the reversal preventing clutch may engage the crank clutch as shown in Fig. 4. In this embodiment, $t^k$ represents the crank clutch acting upon the sleeve $b$. The spring band of clutch $t^k$ has a side projection $t^f$ which is separated from the band portion $t^k$ by a slot $t^s$ extending around a large enough part of the circumference to permit the two band portions $t^k$ and $t^f$ to exert independent clutching effects. The separately acting reversal preventing clutch $t^r$ in this case is disposed on the band portion $t^f$. The action of this construction is fundamentally the same as of those already described. If the crank $u^1$ is rotated in one direction it presses the split part of the sleeve $b$ against the shaft $g$ causing this shaft to rotate. If a rotary movement in the opposite direction is imparted to the shaft $g$ the clutch band $t^r$ is immediately caused to act on the band $t^f$ locking this portion $u^f$ and thereby the band portion $t^k$ of the crank. This will prevent the crank from rotating against the force to which it is subjected by the backward movement of the shaft but will leave the shaft $g$ free to rotate in the other direction.

Fig. 5 shows a somewhat different construction of the clutch coupling. A clutch shoe $t^4$ is slidably mounted in the band $t^5$ and can be pushed inward by means of an eccentric clutch lever $u^4$. Obviously the clutch can be differently designed; the forms of construction shown being examples only of methods which can be employed to carry the invention into effect.

Two opposingly wound springs can also serve as crank and reverse couplings. In the present case the two springs operate by contraction so that the spring which serves as a reversal preventing clutch is always set in preparation for action and will take hold as soon as a rotary movement in the direction opposite to that of the crank takes place. An embodiment of this form of construction is shown in Fig. 6. In this case also $g$ represents the rotating member, $b$ a sleeve fitted thereon and provided with longitudinal slots $f$, and $u^1$ the crank. This crank $u^1$ in the embodiment in question is secured to a casing $a$. On the portion of the sleeve $b$ which is provided with the longitudinal slots $f$, a special spring $c$ is tightly fitted. The end of the spring $c$ is provided with an arm $c^2$ which terminates in spiral turns $c^1$. The turns $c^1$ engage around a pivot $k^1$ fixed on the crank $u^1$. Next to the spiral spring $c$ on the sleeve $b$ a further tight fitting spiral spring $d$ is arranged. The inwardly bent end $d^1$ of the spiral spring $d$, which lies furthest from the crank $u^1$, engages with member $e^1$ which for this purpose has a square or hexagon shaped end $e^3$ fitting a similar opening in the frame and is thus prevented from rotating. The member $e^1$ is also provided with a cylindrical projection $e^4$ which has the same outer diameter as the cylindrical member $b$ and which receives the last turns of the spring $d$ and the end $d^1$. If the crank $u^1$ is rotated in cranking direction or clockwise the left hand wound spring $c$ is tensioned on the sleeve $b$ which engages with the member $g$ due to the clutching effect thus caused. The right hand wound spring $d$ which is prevented from rotating by its connection with the member $e^1$ moves loosely on the sleeve $b$. If a counterclockwise movement is imparted to the member $g$, the right hand wound spring $d$ holds the sleeve $b$ securely and releases the spring $c$ so that the crank $u^1$ remains in the angular position in which it was located at the moment the back-stroke took place.

To enable the rotating member $g$ to be locked against rotation a detent 2, shown in Figs. 1 and 2, is mounted in a boss 4 on the clutch band $t^r$, the said detent being capable of longitudinal displacement in the boss. The end of the detent can engage in the teeth of a ring 1 secured on the shaft $g$, thereby locking the shaft to the band $t^r$. A spring 3 normally urges the detent out of locking position. When the band $t^r$ is locked against rotation by the beginning of a back stroke, the detent 2 prevents the member $g$ from rotating backward when the detent is pushed into the ring 1. In order to lock the shaft $g$, after a clockwise movement of the crank and in order to lock the shaft against counterclockwise movement, it will be sufficient to press the detent 2 into the ring 1 against the action of the spring 3. The detent 2 is then held in engagement with the tooth by the counterclockwise pressure exerted on the member $g$, for instance by the compression of the engine. The member $g$ can then be released from the crank, and the said crank set in another position in readiness for further manipulation. When the shaft is again rotated in a clockwise direction by the crank, the pressure on the detent is released and it moves automatically out of the ring 1 and thus releases the member $g$ for rotation by the crank lever $u^1$ as soon as the crank has overcome the pressure acting on the shaft. In this manner a step-by-step compression can be obtained, for example, in combustion engines by setting the crank lever in the most comfortable position and bringing it back after the shaft $g$ has been partly rotated.

Fig. 7 shows an embodiment of the arrangement applied for the starting of an engine on a motor vehicle. In the case of heavy vehicles it is advisable to arrange a supporting cross bar $s$ on the front of the chassis and to provide the shaft $g$ through a coupling $p$ with an extension $o$ extending to the cross bar $s$ and also design this extension as well as the crank so that they can be joined together at the cross bar. In such a case the cross bar $s$ also receives the fixed portion which locks the reversal preventing clutch against rotation, for example the portion $w$ which supports the lever $u^2$ (Figs. 2 to 4) or a square or hexagon depression to fit the square or hexagon outer member $e^3$ as shown in the embodiment according to Fig. 6. This can be of any desired length in such cranking arrangements so that a greater force can be exerted with same if required and the chassis does not prevent its employment.

What I claim as my invention is:—

1. In combination, a shaft, a sleeve rotatable with respect to said shaft, a crank rotatable with respect to said sleeve, means operated by movement of said crank in one direction to clutch said crank to said sleeve and said sleeve to said shaft, and thereby to rotate said shaft, and means to prevent rotation of said sleeve in the opposite direction, the shaft rotating with respect to the sleeve upon overload.

2. In combination, a shaft, a sleeve rotatably mounted on said shaft, a crank rotatably mounted on one portion of said sleeve, means operated by movement of said crank in one direction to clutch said crank to said sleeve portion and said sleeve portion to said shaft, and means engaging another portion of said sleeve to prevent rotation thereof in the opposite direction, the shaft rotating with respect to the sleeve upon overload.

3. In combination, a shaft, a sleeve rotatable on said shaft, one portion of said sleeve having one or more slots therein, a crank rotatable on said sleeve portion, means on said crank operated by movement of said crank in one direction to compress said sleeve portion against said shaft, whereby said crank is clutched to said sleeve and said sleeve to said shaft, and means to prevent rotation of said sleeve in the opposite direction, said shaft rotating in said sleeve upon overload.

4. In a device as claimed in claim 3, said first means comprising a band at least partially surrounding said sleeve portion, and means operated by movement of said crank to vary the tension in said band, said second means comprising a band engaging another portion of said sleeve, and means to prevent movement of said band.

5. In a device as claimed in claim 3, said second means comprising a band engaging another portion of said sleeve, means to compress said band against said sleeve, and means engaging said last named means to prevent movement of the same and thereby of said band.

6. In a device as claimed in claim 1, means connected to said rotation preventing means adjustable to lock said shaft against rotation in the opposite direction from that in which it is rotated by said crank movement.

7. In a device as claimed in claim 3, cooperating adjustable means on said shaft and on said rotation preventing means to lock said shaft against rotation in the opposite direction from that in which it is rotated by said crank movement.

8. In a device as claimed in claim 1, a toothed wheel fixed on said shaft and a pin fixed on said rotation preventing means adjustable to engage the teeth of said toothed wheel so as to lock said shaft against rotation.

9. In a device as claimed in claim 1, a toothed wheel fixed on said shaft and a pin fixed on said rotation preventing means adjustable to engage the teeth of said toothed wheel so as to lock said shaft against rotation, spring means normally urging said pin out of engagement with said teeth, said pin being held in engagement with said teeth by pressure on said shaft, said pin being released by the initial turning movement of said crank.

10. In a device as claimed in claim 2, spring means normally urging said rotation preventing means to sleeve engaging position.

CARL WALTER.